United States Patent Office 3,804,770
Patented Apr. 16, 1974

3,804,770
EDTA-ORGANOPHOSPHONATE COMPOSITION FOR CONTROLLING SCALE
Walter F. Lorenc, Harvey, and Roland A. Berner, Tinley Park Ill., assignors to Nalco Chemical Company, Chicago, Ill.
No Drawing. Filed Oct. 20, 1972, Ser. No. 299,520
Int. Cl. C02b 5/06
U.S. Cl. 252—180    12 Claims

ABSTRACT OF THE DISCLOSURE

Compositions and methods used to inhibit scale formation and/or the formation of solid scale forming salts comprises adding to water small amounts of a synergistic combination of ethylene diamine tetraacetic acid and a specific organophosphonate.

INTRODUCTION

Most commercial waters contain alkali earth metal cations such as calcium, barium, magnesium, etc., and several anions such as bicarbonate, carbonate, sulfate, oxylate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate exceed the solubility of the calcium carbonate reaction product a solid phase of calcium carbonate will form. Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying systems they form scale. The scale prevents effective heat transfer, interferes with fluid flow, facilitates corrosive processes, and harbors bacteria. This scale is an expensive problem in many industrial water systems, causing delays and shut-downs for cleaning and removal.

Scale forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

Certain organophosphonates have been found to be effective as hardness stabilizers to prevent scale formation. These organophosphonates have been taught by Ralston, U.S. Pat. No. 3,393,150. Certain other compounds are known chelating agents such as nitrilotriacetic acid, and in particular, the sodium salt.

In many industrial applications the amount of treatment often used is based on a ratio of 2.8:1, chelate treatment to hardness ratio.

In U.S. Pat. No. 3,666,664 a nitrilotriacetic acid-organophosphonate composition is disclosed for use in scale inhibition. This synergistic combination of the nitrilotriacetic acid and organophosphonate has been found to be an excellent scale inhibition composition. This above-mentioned patent is incorporated herein by reference.

It has been determined that the combination of ethylenediaminetetraacetic acid and a specific organophosphonate also provides the same synergistic effect and results in excellent scale inhibition properties.

It is an object of this invention to provide a stable chelating composition for the control of scale.

OBJECTS

More specifically, it is an object of this invention to prepare a stable composition containing a synergistic blend of chelating agents useful in an aqueous system.

It is a further object of this invention to provide a synergistic composition for scale control in boiler treatment at a lower treatment level than heretofore achieved.

Further objects will be evident to those skilled in the art.

THE INVENTION

This invention comprises a composition containing a synergistic blend of ethylenediaminetetraacetic acid and a specific organophosphonate in a ratio ranging from 50:1 to 5:1. The tetrasodium salt of ethylenediaminetetraacetic acid is used and is hereinafter referred to as EDTA. Many organophosphonates have been found useful for controlling scale. In particular, Ralston in U.S. Pat. No. 3,393,150 discloses organic amino methylene phosphonates of the formula:

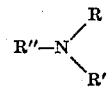

where R is

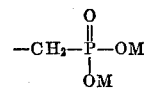

$R'$ is selected from the group consisting of R and

and $R''$ is selected from the group consisting of R,

and

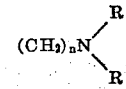

$n$ is a whole number from 1 to 6; and M is independently selected from the group consisting of H, NH$_4$, alkali metal, or combinations thereof. These compositions have been found useful under many conditions because they are readily soluble. The organic phosphonate material of this invention has the formula:

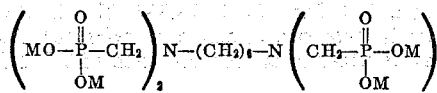

where M is selected from the group consisting of H, NH$_4$, alkali metal, or combinations thereof.

This organic amino methylene phosphonate can be easily prepared from the reaction of hexamethylene diamine, formaldehyde, and phosphorous acid. A particularly preferred phosphonate is the potassium salt of this organophosphonate, which can easily be made by adding potassium hydroxide to the organophosphonate. The potassium salt of this organophosphonate will hereinafter be referred to as OP-1. This organophosphonate material is also effective alone for preventing scale deposits in a water system.

This invention resides in the fact that certain synergistic combinations of EDTA and this organophosphonate give unusual and unexpected results. Generally, the ratio of EDTA to organophosphonate ranges from 50:1 to 5:1 and preferably from 10:1 to 8:1. Preferably, the EDTA is in the form of the sodium salt and the organophosphonate is in the form of the potassium salt.

Therefore, this invention discloses a method of inhibiting the precipitation of scale forming salts in a water system which comprises adding to said system from 0.5 to 1,000 p.p.m. of the synergistic combination or of the organophosphonate material. This method for preventing scale deposits is especially useful when the water contains at least one of barium sulfate, calcium sulfate, calcium carbonate, calcium silicate, magnesium carbonate and magnesium sulfate. An effective scale inhibiting amount of the synergistic combination is very useful in preventing scale formation on metal surfaces.

A preferred embodiment of this invention involves the formulation containing a polymer either alone or in conjunction with the processed lignite sludge conditioner. Many polymers are known to those skilled in the art and have been found useful for preventing scale formation. For example the polymer could be a water-soluble sulfoxy-free polar addition polymer. The polymer may be present in the range of 0.5 to 15% by weight. The lignite may be present in the concentration of 1 to 10% by weight.

These water-soluble sulfoxy-free polar addition polymers encompass a large group of water-soluble polymeric compounds. As indicated, these polymers should have a molecular weight of at least 1,000. As will be shown in some detail, the molecular weight of these polymers is not deemed critical to the success of the invention. It has been discovered that polymers having low, intermediate or high molecular weights all produce satisfactory results when used in the practice of this invention. When used herein the expression "low molecular weight," encompass polymers having a molecular weight range of from 1,000 to 40,000. Intermediate molecular weight polymers may be arbitrarily described as having molecular weights within the range of 40,000 to 500,000. High molecular weight polymers encompass all polymers having molecular weights greater than 500,000 and in some instances may be in excess of several million.

A particularly effective class of water-soluble sulfoxy-free polar addition polymers have as a part of their molecular configuration at least 5% by weight of side chain groups which will be either anionic or which under conditions of alkaline hydrolysis are capable of being converted into anionic functional groups.

These anionic polymers desirably contain as a functional side-chain group, carboxylic acid groups, carboxylic anhydride groups, carboxylic salt groups, carboxylic acid ester groups or carboxylic acid amide groups. As indicated, in the case of the esters and amides, under normal alkaline boiler conditions these materials hydrolyze to the alkali metal or alkaline earth metal salt form. The preferred water-soluble anionic polymers are those described in Johnston, U.S. Pat. No. 2,723,956. The disclosure of this patent is incorporated herein by reference. An antifoam may be added in the concentration of 0.5 to 5% by weight.

Further discussion of these polymers is disclosed in U.S. Pat. No. 3,549,538, which is incorporated herein by reference.

The following formulation was used: the tetrasodium salt of EDTA, 85.2 weight percent; OP-1, 4.3%; a processed lignite sludge conditioner, 8.4%; and an antifoam, 2.1%. The following results were obtained. This is known as Formulation 1.

In order to test this synergistic combination the following tests and test equipment were used.

EVALUATION OF THE INVENTION

The test equipment used in the following test runs consists of an inclined tube experimental boiler with natural thermal circulation. Volume at normal operating level was 0.56 gallon. The water level itself was automatically controlled by 3 insulated electrodes which made contact with the boiler water to operate relays which controlled the feed water pump and heating element. Pressure control was by manual adjustment of a needle valve in the condensed steam line. Boiler test specimens were low carbon steel tubes, 1½ inches O.D. x 10 inches long, closed at one end and flanged at the other. The tubes were bolted in the boiler at an angle of 30° from the horizontal with the closed end down. Heat was applied to the inside and water surrounded the outside. A soft corrugated copper gasket was used to seal the tube in the boiler. The test surface itself was cleaned and polished with No. 3/0 emery paper before each test. Tests were run in absence of chemical (blank) and in a comparative manner with varying dosages of test chemical. Percent scale prevention was then calculated by measuring deposition of scale upon the test specimen with benefit of chemical boiler additive, while using the blank run as a basis of comparison and a base of 0 percent reduction. Naturally, a blank run being without chemical additive gives no scale reduction.

The tests were run at ten concentrations, meaning that 10 volumes of water were boiled to give one volume for the test. Tests could have been conducted at 2, 50, 100 or any other concentration.

The feed water contained 4.3 p.p.m. calcium and 2.1 p.p.m. magnesium calculated as calcium carbonate. This is 6.4 p.p.m. total hardness. The feed water also contained 1.5 p.p.m. iron. The tests were conducted at 900 p.s.i. The following results were obtained using the components and dosages as shown in Table I.

TABLE I

| Component | Dosage (p.p.m.) | Percent scale prevention |
|---|---|---|
| EDTA | 4.10 | 20 |
| OP-1 | 0.41 | 40 |
| Sodium lignosulfonate | 0.42 | 0 |
| Antifoam | 0.10 | 10 |
| Formulation 1 | 5.00 | 80 |

From the data presented above, the scale prevention of the four components added together is a value of 70. The formulation of them together results in a value of 80. This is a significant increase in the scale prevention and illustrates the synergistic effect of the combination. This synergistic blend achieves unusual and unexpected results and is more than a mere addition of two known chelates as scale prevention additives. The product composition can be varied to include organic polymers such as polyacrylates, acrylamide acrylate copolymers, styrene maleic anhydride, hydrolyzed polyacrylonitrile, and others known to those skilled in the art. A new lower treatment level is possible using this combination than was previously known in the art. Additionally, a residual effect herein referred to as persistence provides deposit prevention for a time after the product application has stopped.

We claim:

1. A scale preventative composition consisting essentially of a combination of ethylenediaminetetraacetic acid and an organophosphonate material having the formula:

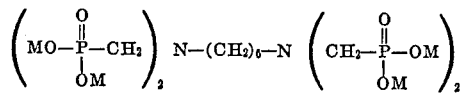

where M is selected from the group consisting of H, NH$_4$, alkali metal and combinations thereof; wherein the ratio of EDTA to organophosphonate ranges from 50:1 to 5:1.

2. The composition of claim 1 in which the ethylenediaminetetraacetic acid is present as the sodium salt.

3. The composition of claim 1 in which the organophosphonate is present as the potassium salt.

4. The scale preventative composition of claim 1 which additionally contains from 1 to 10% by weight of a processed lignite sludge conditioner.

5. A method of inhibiting the precipitation of scale forming salts in a water system comprising adding to said system from 0.5 to 1,000 p.p.m. of the composition of claim 1.

6. A process for preventing scale deposits of at least one of barium sulfate, calcium sulfate, calcium carbonate, calcium silicate, magnesium sulfate and magnesium carbonate on metal surfaces and contact with water containing said scale forming chemicals which comprises contacting said metal surfaces with said water while maintaining therein an effective scale inhibiting amount of the composition of claim 1.

7. A method of inhibiting the precipitation of scale forming salts in a boiler system which comprises adding to said system from 0.5 to 1,000 p.p.m. of the composition of claim 1.

8. The composition of claim 1 which comprises the additional ingredient of an antifoam.

9. The composition of claim 8 in which the antifoam comprises from 0.5 to 5% by weight of the composition.

10. The composition of claim 1 which comprises the additional ingredient of water-soluble sulfoxy-free polar addition polymer which has at least 5% by weight of side chain groups which are anionic.

11. The composition of claim 10 in which the polymer comprises from 0.5 to 15% by weight of the composition.

12. The composition of claim 1 which comprises the additional ingredient of water-soluble sulfoxy-free polar addition polymer which under conditions of alkaline hydrolysis are capable of being converted to anionic functional groups.

References Cited
UNITED STATES PATENTS

| | | | |
|---|---|---|---|
| 3,549,538 | 12/1970 | Jacklin | 252—82 |
| 3,393,150 | 7/1968 | Ralston | 210—58 |
| 3,723,347 | 3/1973 | Mitchell | 252—181 |

LEON D. ROSDOL, Primary Examiner

J. WARE, Assistant Examiner

U.S. Cl. X.R.

210—58